United States Patent [19]

Fahrig et al.

[11] 4,310,489

[45] Jan. 12, 1982

[54] APPARATUS FOR THE CATALYTIC CRACKING OF HYDROCARBONS

[75] Inventors: Robert J. Fahrig, Lansing; Lansing M. Hinrichs, Chicago, both of Ill.

[73] Assignee: Standard Oil Company (Indiana), Chicago, Ill.

[21] Appl. No.: 178,140

[22] Filed: Aug. 14, 1980

[51] Int. Cl.³ .................... G05D 7/00; G05D 16/00; B01J 8/26; B01J 8/18
[52] U.S. Cl. .................... 422/110; 208/153; 208/161; 422/112; 422/142; 422/145; 422/147
[58] Field of Search ............. 422/142, 145, 147, 144, 422/110, 112; 208/153, 161

[56] References Cited

U.S. PATENT DOCUMENTS

| | | | |
|---|---|---|---|
| 2,901,420 | 8/1959 | Evans | 422/147 X |
| 3,243,265 | 3/1966 | Annesser | 208/153 X |
| 3,687,841 | 8/1972 | Saxton et al. | 208/164 |
| 3,690,841 | 9/1972 | Bunn et al. | 422/144 |
| 3,751,359 | 8/1973 | Bunn | 422/144 X |
| 3,806,324 | 4/1974 | Maclean et al. | 422/145 X |
| 3,826,738 | 7/1974 | Zenz | 208/153 |
| 3,841,843 | 10/1974 | Williams et al. | 422/145 |
| 3,893,812 | 7/1975 | Conner et al. | 422/145 X |
| 3,928,172 | 12/1975 | Davis et al. | 208/77 |
| 3,957,443 | 5/1976 | Strickland et al. | 422/145 |
| 3,970,587 | 7/1976 | Shinnar et al. | 422/144 X |
| 4,067,798 | 1/1978 | Hauschildt et al. | 208/92 |
| 4,070,159 | 1/1978 | Myers et al. | 422/147 |
| 4,219,407 | 8/1980 | Haddad et al. | 208/153 X |

*Primary Examiner*—Barry Richman
*Attorney, Agent, or Firm*—Lansing M. Hinrichs; William T. McClain; William H. Magidson

[57] ABSTRACT

An apparatus for the catalytic cracking of hydrocarbons having two independent transfer line reactors, each of which is associated with an independent cyclone separation system and wherein the cyclone separation systems are located within a common separator vessel. More particularly, the improved apparatus can be used for the simultaneous fluidized catalytic cracking of a hydrocarbon feedstock and the recracking of a selected fraction of the products from said cracking without commingling the feedstock and the selected fraction to be recracked.

4 Claims, 3 Drawing Figures

APPARATUS FOR THE CATALYTIC CRACKING OF HYDROCARBONS

BACKGROUND OF THE INVENTION

1. Field of the Invention

This invention relates to an apparatus for the catalytic cracking of hydrocarbons. The apparatus comprises two independent transfer line reactors, each of which is associated with an independent cyclone separation system and wherein the cyclone separation systems are located within a common separator vessel. More particularly, the invention relates to an improved apparatus which can be used for the simultaneous fluidized catalytic cracking of a hydrocarbon feedstock and the re-cracking of a selected fraction of the products from said cracking without commingling the feedstock and the selected fraction to be recracked.

2. Description of the Prior Art

Catalytic cracking of heavy petroleum fractions is one of the major refining operations employed in the conversion of crude petroleum oils to useful products such as the fuels which are utilized by internal combustion engines. In fluidized catalytic cracking processes, high molecular weight hydrocarbon liquids and vapors are contacted with hot, finely divided, solid catalyst particles, either in a fluidized bed reactor or in an elongated transfer line or riser reactor, and maintained at an elevated temperature in a fluidized or dispersed state for a period of time sufficient to effect the desired degree of cracking to lower molecular weight hydrocarbons of the kind typically present in motor gasoline and distillate fuels.

Products from the catalytic cracking of heavy petroleum fractions have been of suitable quality for direct use as gasoline blending components. However, the recent trend toward lower sulfur and lead levels in gasoline has made some form of reprocessing of the catalytic cracking product desirable. In addition, requirements for additional sources of light olefins for either chemical feedstock or alkylate feedstock and of light aromatics for chemical feedstock have also made reprocessing desirable.

A typical product mix obtained from the fluid catalytic cracking of a gas oil or heavier feedstock is given in the following Table:

| PRODUCTS | WEIGHT PERCENT BASED ON FRESH FEED | APPROXIMATE BOILING RANGE °C. |
|---|---|---|
| Light Naphtha | 25 | 25 to 115 |
| Heavy Naphtha | 25 | 115 to 200 |
| Light Cycle Oil | 15 | 200 to 340 |
| Butanes-Butylenes | 10 | −12 to +4 |
| Propane-Propylene | 5 | −48 to −42 |
| Ethane and Lighter | 5 | |
| Heavy Cycle Oil | 5 | 340 to 425 |
| Decanted Oil | 5 | 425 + |
| Coke | 5 | Nonvolatile |

It has been suggested to recycle the heavy cycle oil and decanted oil separated by fractionation by reincorporating them with the fresh feed, and it has also been proposed that benefits can be derived by recracking a selected boiling range intermediate fraction of the light cycle oil and the heavy naphtha. If selected boiling range fraction of the light cycle oil and heavy naphtha are reintroduced with the fresh feed, conversion is limited for the fraction is simply being subjected a second time to the same conditions. Accordingly, it is preferred to fractionate the cracked products and to recrack the selected boiling range fraction of either or both the heavy naphtha and light cycle oil, separately from the fresh feed and at an appropriate degree of severity.

U.S. Pat. No. 3,928,172 to Davis et al. discloses a method for improving the quality and volatility of a refinery gasoline pool which comprises catalytically cracking a gas oil, fractionating the resulting products, and recracking the heavy naphtha which is obtained from the fractionation. This patent discloses a catalytic cracking apparatus which comprises two independent vertical transfer line reactors wherein one transfer line reactor is for gas oil cracking and the other is for heavy naphtha recracking. Each transfer line reactor is directly connected to a separate cyclone separation system, and the hydrocarbon products flow from each cyclone system to a separate product recovery system. Davis et al. disclose a number of different apparatus configurations but do not disclose apparatus wherein a compact arrangement with separate riser reactors for feedstock and a cracked fraction open into the same separator vessel wherein provision to prevent commingling of the cracked products is provided.

U.S. Pat. No. 4,067,798 to Hauschildt et al. also discloses a method for improving the quality of a refinery gasoline pool. Hauschildt et al. teach that a feedstock comprising from 80 to 100 volume percent of a hydrocarbon fraction containing at least 25 weight percent of mono-aromatic hydrocarbons and boiling in the boiling range of heavy gasoline in combination with from 0 to 20 volume percent of a vaporizable hydrocarbon fraction can be catalytically cracked to produce a product having an increased low molecular weight olefin and mono-aromatic content, a substantially reduced sulfur content, and a high octane rating relative to the feedstock. It is disclosed that the fraction comprising from 80 to 100 volume percent of the feedstock is preferably a catalytic cracking product. It is also disclosed that the feedstock must be subjected to catalytic cracking in the absence of any other feedstock and the products must be isolated separately from any other products. Although the Hauschildt et al. process can be carried out using conventional apparatus for the catalytic cracking of hydrocarbons, there is a need for an apparatus which will permit the more efficient practice of this process.

SUMMARY OF THE INVENTION

A primary object of this invention is to provide a fluid catalytic cracking apparatus and associated fractionation equipment capable of initially cracking a hydrocarbon feedstock in a reaction zone, separating a selected fraction from said cracked feedstock for recracking, recracking the selected fraction in a second reaction zone under different reaction conditions from those of the initial cracking, and separately fractionating the products of the initial cracking and the recracking, the apparatus having common stripping and regeneration equipment for receiving the spent catalyst from both reaction zones and reactivating it for reuse.

Another object is to provide a compact apparatus having separate vertical riser reactors for the initial and the secondary recracking steps, both risers opening into an enclosed separator vessel and having a novel arrangement for maintaining separation of the initial cracking products and the recracking products and for rapidly disengaging the spent catalyst from the product streams.

A further object is to provide an apparatus arrangement whereby facilities for recracking of a selected fraction may be easily incorporated into existing fluid catalytic cracking units.

This invention is directed to an improved fluidized catalytic cracking system comprising in combination a spent catalyst stripper, a spent catalyst regenerator, and multiple reactors. The improvement of the present invention involves apparatus for fluid catalytic cracking and for simultaneously effecting primary cracking of a hydrocarbon feedstock, separating the cracked products into a desired product fraction, an intermediate fraction suitable for additional secondary cracking and a heavy fraction suitable for recycle to the primary cracking. A preferred embodiment of the apparatus comprises:

(a) a primary riser reactor having inlet means at its lower end for introduction of hydrocarbon feedstock together with a heavy recycle fraction and regenerated fluid catalytic cracking catalyst, the upper end of said primary riser reactor opening into a separator vessel;

(b) a primary fractionation tower interconnected with the vapor space at the top of the separator vessel for receiving and separating the vaporized cracked products from the primary riser reactor;

(c) a secondary riser reactor having inlet means at its lower end for receiving an intermediate fraction from said primary fractionation tower together with regenerated fluid catalytic cracking catalyst, the upper end of said secondary riser reactor opening into said separator vessel;

(d) a flow reversal means at the upper end of said secondary riser reactor and attached downwardly directed flow reversal conduit for directing the flow of recracked hydrocarbon product and entrained cracking catalyst downwardly toward the bottom of said separator vessel;

(e) cyclone separator means having an opening laterally communicating with the interior of said flow reversal conduit and connected to vent the recracked hydrocarbon products outside of the separator vessel; and (f) a secondary fractionation tower for receiving and separating the recracked hydrocarbon products into desired products and products suitable for recycling.

A more preferred embodiment also includes a flow reversal means and flow reversal conduit associated with the primary riser reactor and having the primary cyclone separator means laterally communicating with the interior of the flow reversal conduit to vent the primary cracked product outside of the separator vessel and to direct the spent catalyst directly to a stripping zone at the bottom of the separator vessel. This arrangement is more fully described and claimed in our copending U.S. patent application Ser. No. 96,939 filed Nov. 23, 1979, the entirety of which is hereby incorporated by reference.

DETAILED DESCRIPTION OF THE INVENTION

The present invention can be best understood by reference to the attached drawings. It will be understood, however, that the invention is not limited to the embodiment shown and that the invention includes alternatives and equivalents which are within the scope of the appended claims.

Figure 1:
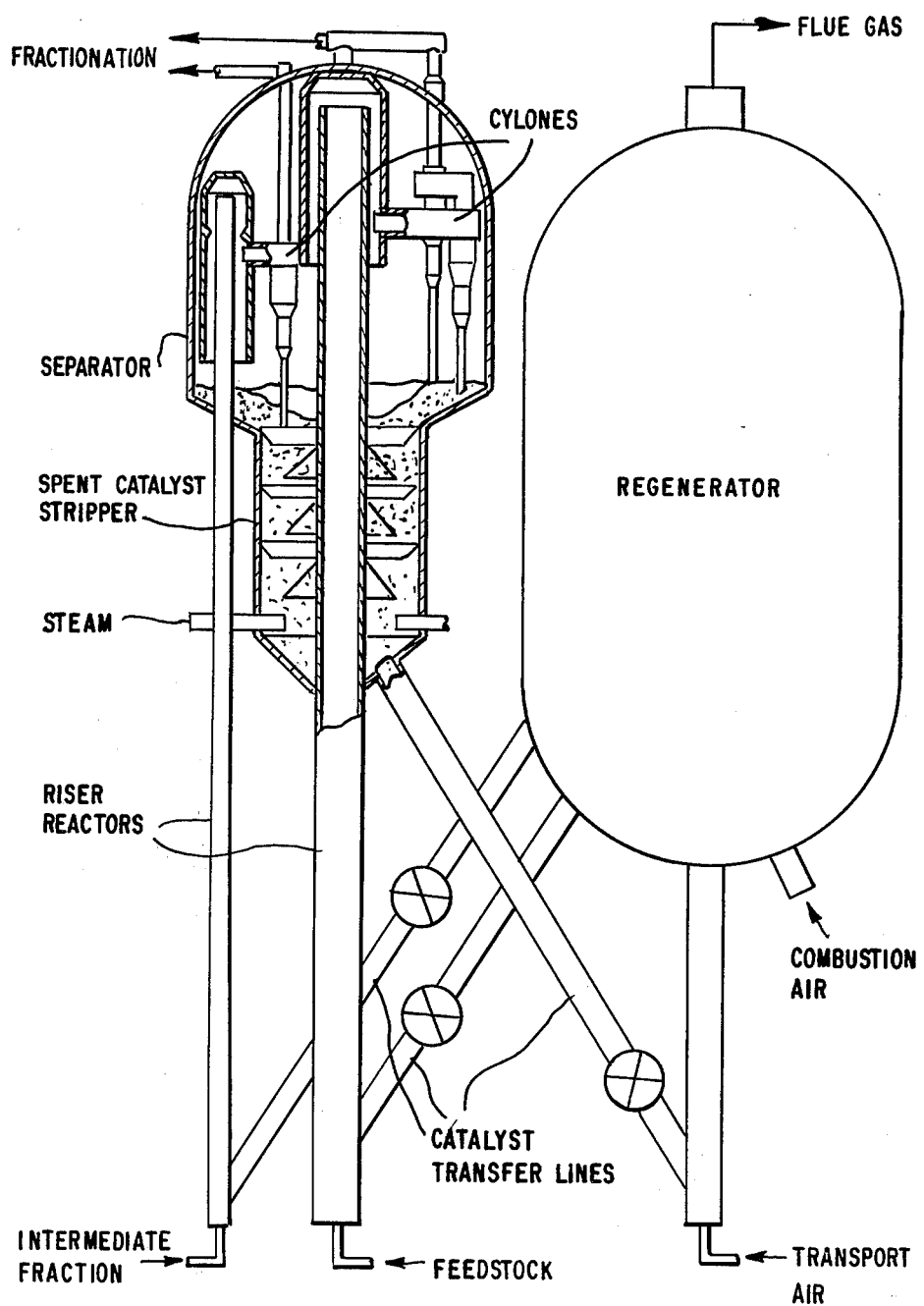
FIG. 1 is a diagrammatic elevational view of a fluid catalytic cracking unit incorporating features of this invention.

In FIG. 1 there is shown the general arrangement of a fluid catalytic cracking unit incorporating features of this invention. As will be apparent, the feedstock to be cracked is introduced at the bottom of a riser reactor together with hot regenerated catalyst from the regenerator. The hot catalyst vaporizes the feedstock and the two rise together to the upper end of the riser in the separator vessel, catalytic cracking of the feedstock occurs during its journey up the riser. At the top of this riser, the flow of cracked products and catalyst is reversed and the cracked products are withdrawn through cyclones and transported to fractionation apparatus which is more fully shown in FIG. 2. The spent catalyst, accelerated by gravity, flows downwardly into a catalyst stripper at the bottom of the separator vessel where volatile cracked products adhering thereto are stripped by steam. From the stripper the catalyst passes to the regenerator where nonvolatile coke formed thereon during cracking is burned off by combustion air. In the regenerator any conventional regeneration process may be utilized including that disclosed in U.S. Pat. No. 3,909,392 to Horecky et al. The temperatures in the regeneration zone are ordinarily in the range of 565° to about 815° C. and preferably in the range of about 620° and 735° C., and thus the hot regenerated catalyst is able to readily supply the heat required to vaporize and crack the feedstock. Cracking temperatures are in the range of from about 430° and 700° C. and preferably from about 450° to 565° C. for a normal feedstock.

Figure 2:
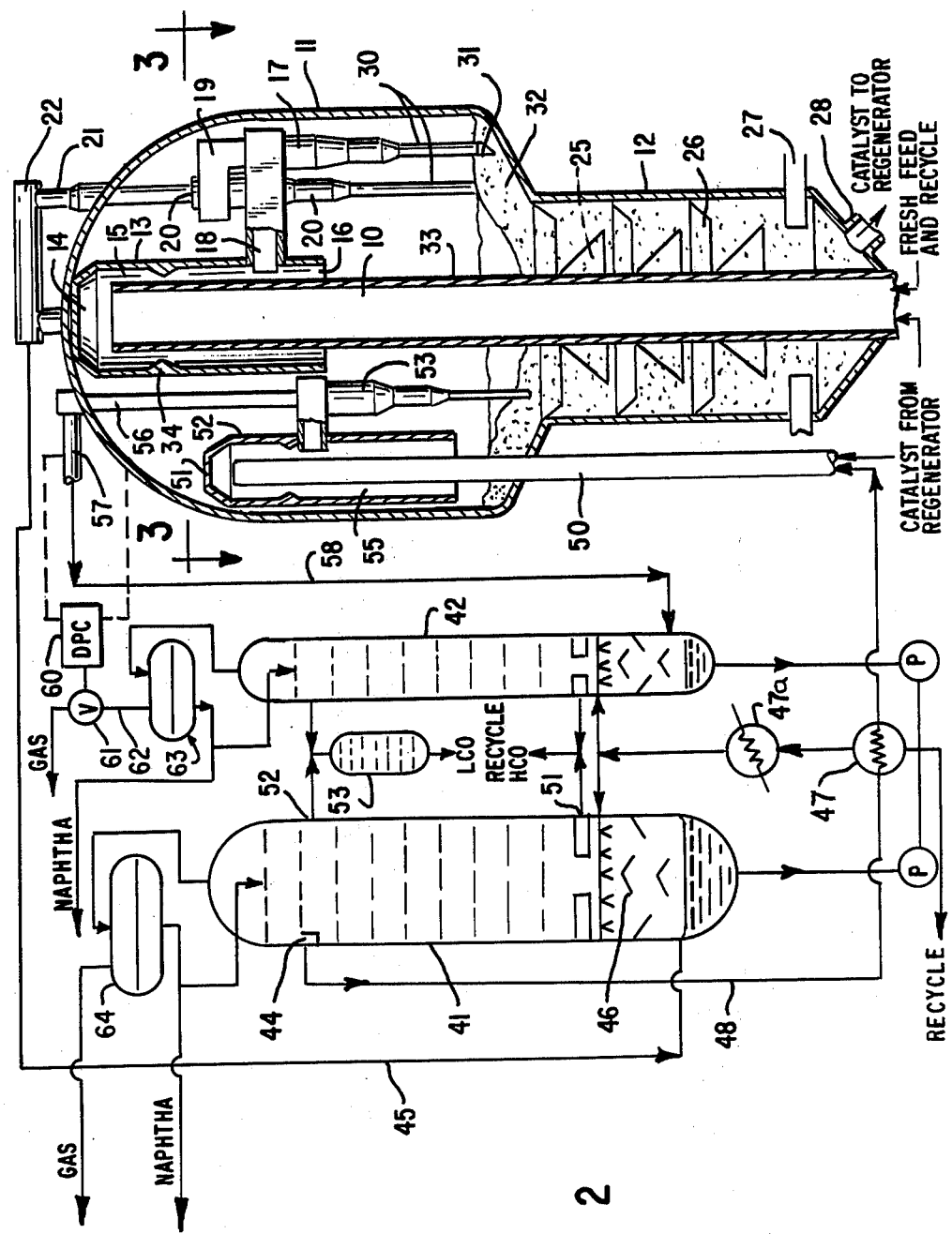
FIG. 2 is a diagramatic elevational view of a fluid catalytic cracking unit and associated fractionation equipment of a preferred embodiment of this invention.

The cracked hydrocarbon products withdrawn through the primary cyclones pass to fractionation apparatus, a preferred embodiment of which is shown in FIG. 2 of the drawings, and an intermediate suitable boiling range fraction preferably of heavy naphtha and light cycle oil separated in the fractionation apparatus is supplied to the lower inlet end of the second riser reactor together with regenerated catalyst. In the secondary riser reactor the hot regenerated catalyst vaporizes and recracks the intermediate fraction into desired products. At the upper end of the secondary riser reactor there is located a flow reversal means connected to a flow reversal conduit for directing the flow of recracked products and catalyst in a downward direction. One or more cyclone separators opening through the wall of the flow reversing conduit is provided for laterally withdrawing the recracked product. From these cyclones the recracked products are conducted outside of the separator vessel and sent to the fractionation apparatus.

Figure 3:
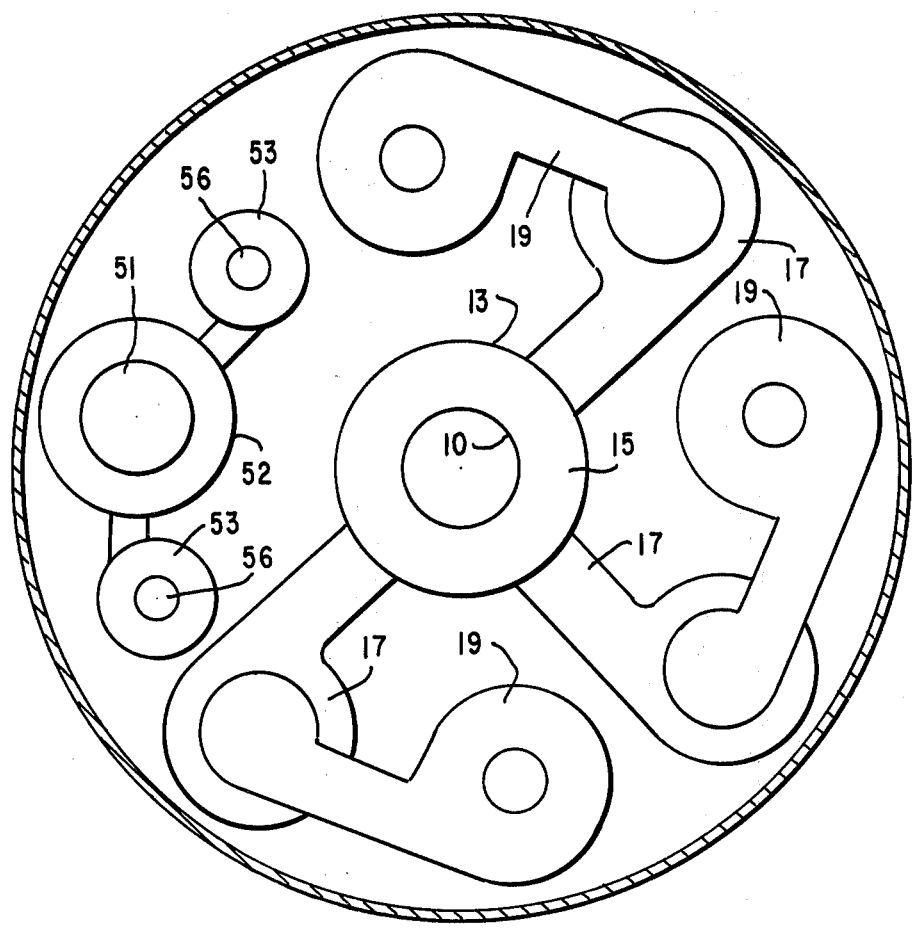
FIG. 3 is a horizontal section taken through the separator vessel on line 3—3 of FIG. 2.

The apparatus of this invention can best be understood by reference to FIGS. 2 and 3 of the drawings. The primary vertical riser 10 enters the separator vessel 11 through the spent catalyst stripper 12 and extends to a point near the top of vessel 11. A cylinder 13 whose upper end is closed by a cap 14 is suspended from the top of the vessel 11 in coaxial overlapping or telescoping relationship with the riser 10, the two together constituting a flow reversal means which discharges into a downwardly directed flow reversal conduit whose lower end 16 opens into the vessel 11. A plurality of first stage cyclones 17 are disposed about the flow reversal conduit 13 with their inlets 18 opening into the annular passageway 15 through the wall of conduit 13. The vapor outlets 19 of the first stage cyclones 17 are connected to second stage cyclones 20 and the vapor outlets 21 of the second stage cyclones 20 pass out of the vessel 11, preferably through the top, and are connected to header 22 which is in turn connected to fractionation equipment as will be described later. In the event second stage cyclones are not employed, the vapor outlets of the primary cyclones exit through the top of the vessel 11 and interconnect with the header 22. Such an arrangement is illustrated in FIG. 1.

The stripper 12 located at the bottom of the separator vessel 11 comprises a plurality of frustroconical baffles 25 attached to the riser 10 and interspersed frustroconical baffles 26 attached to the side wall of stripper 12. Stripping steam or inert gas is introduced into the stripping zone 12 through nozzles 27. Stripped catalyst is conducted out of the stripping zone through catalyst transfer line 28.

All of the cyclones have dip-legs 30 which extend downwardly to points near the bottom of the separator vessel 11. The dip-legs 30 are preferably provided with flapper valves 31 at their lowest ends which open to permit the flow of the small amount of catalyst separated in the cyclones into the bed of catalyst 32 which extends into the stripper 12.

Because of the highly abrasive nature of cracking catalyst particulates moving at high velocity, it is preferred to line the riser reactor 10, the cylinder 13 and cap 14 with abrasion resistant refractory indicated at 33. In a preferred embodiment at a point 34 somewhat above the ports 18 to which the first stage cyclones 17 are connected, the refractory is built up to provide a venturi-like restriction or throat and reduce the flow area of the annular passageway 15. The purpose of this restriction is to increase the velocity of the flowing vapors to accelerate the entrained catalyst particulates upstream of the ports 18.

In a preferred embodiment, the fractionation apparatus includes a primary fractionator tower 41 for separating vaporized products from the primary riser reactor and an additional secondary fractionator tower 42 for separating vaporized products from the secondary riser reactor 43. These towers can be of conventional construction except that a drawoff tray 44 (or equivalent) is provided near the top of the primary fractionator for removal of the heavy naphtha plus light cycle oil cut. Preferably drawoffs are provided at a plurality of elevations near the tower top so that, as desired, selected intermediate fractions may be removed. The vaporized products from primary cracking at a temperature of from about 480° and 540° C. pass from header 22 through line 45 to a point near the bottom of the tower 41 where they are cooled by circulating a slurry stream through a baffle section 46. The slurry stream (catalyst and heavy oil) is withdrawn from the bottom of the tower 41 and pumped through heat exchangers 47 and 47a. The heat exchanger 47 heats the heavy naphtha and light cycle oil withdrawn from drawoff tray 44 through line 48 at a temperature in the range of from about 195° to 265° C. to a temperature of about 300° to 350° C. at which it is sufficiently preheated for introduction into the secondary riser reactor 50 for recracking into desired lighter products. Alternately a separate preheat furnace can be employed. Heat exchanger 47 is employed to preheat the fresh feed to the primary riser reactor 10. The two heat exchangers are shown connected in series. They could, of course, be connected in parallel or in series in the opposite order, if desired. Another alternative is to utilize one heat exchanger for tower 41 and the second for tower 42. A portion of the circulating slurry is withdrawn, passed through a slurry settler (not shown) to produce decanted oil which can be sent out as product and catalyst containing concentrated slurry which is recycled to the primary riser reactor 10. Drawoff points are indicated at 51 for heavy cycle oil, all or a portion of which can be recycled to riser reactor 10, and at 52 for a light cycle oil fraction which can be sent out as a light fuel oil product or used as hydrocracker feedstock. A steam stripper for this light cycle oil is indicated at 53.

The secondary riser reactor is supplied at its lower end with hot regenerated catalyst from the regenerator and with the intermediate fraction, preferably heavy catalytic naphtha and light cycle oil through line 48. The upper end of the riser reactor 50 extends into the separator vessel into a flow reverser means comprising a cap 51 and a downwardly extended conduit 52. The arrangement of the elements and their construction is preferably similar to those described in more detail in connection with the primary riser reactor 10 except that the secondary riser reactor 50 should be of smaller diameter because its throughput is less.

One or more cyclones 53 are disposed about the flow reversal conduit 52 with their inlets 54 opening into the annular passageway 55 through the wall of conduit 52. The vapor outlets 56 of these cyclones 53 extend outwardly through a wall of separator vessel 11 to a header 57. Only first stage cyclones are illustrated in the drawing and, as will be readily apparent to those skilled in the art, second stage cyclones interconnected in the same fashion as those serving the primary riser reactor can be employed if desired. The header 57 is connected by conduit 58 to the bottom of the secondary fractionation tower 42. This tower is preferably smaller in size than the primary tower 41 but is essentially equivalent in height for the reason that some polymerization will occur during secondary cracking so that some heavy cycle oil type product will be formed even though none should be present in the feed to the reactor 50.

For a unit having a feed rate of 1,200,000 metric tons per year (approximately 25,000 barrels per stream day), the following are typical dimensions. The primary riser reactor is 25 meters in height, the bottom portion tapering from a diameter at the bottom inlet end of 0.85 meter to a diameter of 1.0 meter at an elevation of about ten meters. The upper 15 meter section is not tapered. The internal diameter of the cylinder enclosing the upper end of the riser reactor is 1.75 meters and it extends downwardly approximately five meters below the upper part of the cap 14. The internal diameter of the cylinder at the venturi throat is 1.5 meters. The distance from the top of the riser reactor to the top of the cap is one meter. The stripper 12 is 3 meters in diameter and 6 meters in height. The vessel 11 is 5 meters in diameter and readily encloses three first stage primary and three second stage cyclones as well as the secondary riser reactor and its associated cyclones. Some of the cyclones could be located outside of the vessel but problems of thermal expansion and contraction and leaks which may develop are minimized by mounting the cyclones within the vessel. By hanging the assembly of cyclones and the flow reverser all from the top of the vessel and fabricating them from the same material of construction, expansion and contraction problems are minimized since the cyclones and the flow reversal cylinders will be at essentially the same temperature even during upsets in operation which may occur.

An important feature of the apparatus of this invention is the provision of a differential pressure controller 60 responsive to the difference in pressure within the separator vessel 11 and the header 57. This controller controls the setting of a valve 61 in gas exit conduit 62 extending from the vapor space of a gas-liquid separator 63 which receives vapor-liquid from the top of the tower 42 and separates the two into a light naphtha liquid stream, part of which is employed as reflux in the tower, and the remainder which is passed to the vapor recovery unit (not shown) as product. The gaseous product also passes to the vapor recovery unit. A similar separator 64 is provided for the gas-liquid products of the primary fractionation tower 41. The function of the valve 61 is to control the relative pressure within the annular space 55 and to maintain it at least equal to or only slightly higher (preferably about 500 mm of water) than the pressure within the separator vessel 11. The reason for this is to insure that stripping steam from stripper will exit through the openings 18 in the primary riser reactor flow reverser and not through the secondary riser reactor cyclone system. This insures that any cracked products accumulating within the separator vessel 11 will not be intermixed with the effluent products from secondary riser cracking but will be swept out with the stripping steam and conducted to the primary fractionation tower 41. In this manner bypassing of any heavy naphtha or light cycle oil products past the secondary cracker which would be deleterious to product quality is prevented. The reason for avoiding bypassing is that the heavy catalytic naphtha and light cycle oil are high in sulfur content and this sulfur will turn up in the gasoline pool if bypassing occurs. Moreover, the clear octane number of the gasoline pool will be lowered if straight chain low octane paraffins present in the heavy catalytic naphtha are not recracked. The control valve 61 is preferably located downstream of the fractionator tower in conduit 62 as this is the first point at which a stream free of catalyst is encountered. If the control valves were located in conduit 57 mechanical difficulties brought about by the presence of the catalyst and coke such as plugging or jamming of moving parts would be encountered. Alternatively, control valve 61 may be operated in flow control mode responsive to the rate of flow in conduit 62.

METHOD OF OPERATION

The utility and advantages of the system of apparatus of this invention can best be understood by reference to a preferred method of operation of the apparatus, as shown in FIGS. 1–3 of the drawings, to effect primary cracking of a gas oil feedstock and secondary recracking of a selected fraction to obtain a desired product slate.

Hot regenerated catalyst particulates preferably having a size of not greater than about 100 microns with a major proportion thereof in the range of from about 40 to 80 microns and at a temperature of between about 625° and 750° C. enter the primary riser reactor 10 at the bottom through the catalyst transfer line as shown in FIG. 1. Suitable hydrocarbon cracking catalysts for use in the practice of this invention include all high-activity solid catalysts which are stable under the required conditions. Suitable catalysts include those of the amorphous silica-alumina type having an alumina content of about 10 to about 30 weight percent. Catalysts of the silica-magnesia type are also suitable which have a magnesia content of about 20 weight percent. Preferred catalysts include those of the zeolite-type which comprise from about 0.5 to about 50 weight percent and preferably from about 1 to about 30 weight percent of a crystalline aluminosilicate component distributed throughout a porous matrix. Zeolite-type cracking catalysts are preferred because of their thermal stability and high catalytic activity.

Suitable hydrocarbon feedstocks for use in a fluidized catalytic cracking process in accordance with this invention include, but are not limited to, petroleum fractions such as light gas oils, heavy gas oils, wide-cut gas oils, vacuum gas oils, naphthas, decanted oils, residual fractions and cycle oils derived from any of these as well as hydrocarbon fractions derived from shale oils, tar sands processing, synthetic oils, coal liquefaction and the like. Any of these suitable feedstocks can be employed either singly or in any desired combination.

The hydrocarbon feedstock to be cracked is supplied to the primary riser reactor 10 at its lower end through nozzles. (See FIG. 1) Vaporization and cracking of the feedstock begins immediately and the vaporous hydrocarbon proceeds up the riser together with entrained catalyst particulates, the upward motion of the particulates being induced by the fluid flow drag exerted thereon. Because of the inertial and gravitational forces, the linear velocity of the particulates is less than that of the hydrocarbons, typically being about one third to one half the hydrocarbon velocity and being relatively higher at the upper end of the riser. At the top of the riser the hydrocarbon velocity can be in the range of three to thirty meters per second and the catalyst velocity can be between about one and about twenty-five meters per second. Typical values are about ten meters per second hydrocarbon velocity and about six meters per second catalyst velocity and about six meters per second catalyst velocity at the upper end of the riser.

From the open end of the riser 10 the hydrocarbon vapors which have been cracked to the desired degree during passage up the riser enter the flow reverser 13 and pass downwardly through the annular space 15. The entrained catalyst particulates are carried with the hydrocarbon vapors and may impinge upon the surfaces of the cap 14 in essentially elastic collision. In practice the lower surface of the cap 14 is protected from erosion by the use of a refractory lining and the accumulation of a static layer of particulate catalyst thereunder upon which the particulates impinge.

As the hydrocarbon vapors and catalyst particulates begin passage downwardly through the space 15, the gravitational force rather than opposing the fluid flow drag force augments this force, the resulting acceleration (980 cm/sec$^2$) substantially increasing the inertial momentum of the catalyst particulates. In the preferred embodiment of the apparatus, the cross-sectional area of the annular space 15 is approximately equal to the cross-sectional area of the riser 10 whereby the linear velocity of the hydrocarbon vapors is substantially the same as that at the upper end of the riser. In cases where it is desired to increase the fluid flow drag force the venturi like projection indicated at 34 can be provided at any desired elevation within the flow reverser 13 and above the cyclone inlets 18. Placed close to the inlets the projection 34 can also serve as diverter to deflect catalyst particulates inwardly away from these inlets.

The increment of velocity increase induced by gravitational force is a function of the residence time of the catalyst particulates within the annular space 15. If free fall were to occur as would be the case if there were no fluid flow drag effect, the particulates would require approximately one second to fall the five meter distance from the top of the flow reverser 13 to its lower extremity and their exit velocity would be approximately ten meters per second. This velocity is substantially in excess of the typical catalyst velocity at the top of a riser (6 meters/sec.) described above and represents a minimum value for the exit velocity of the catalyst particulates from flow reverser because the fluid flow drag effect induced velocity increment is additive to the gravity induced increment.

When the downwardly flowing stream of hydrocarbon vapors and entrained catalyst particulates reaches the cyclone inlets 18 the hydrocarbon vapors pass laterally from the annular space 15 and into the primary cyclones 17. Based upon catalyst circulation rate, which is usually the controlling factor, the stream rate is normally between about 1.5 to 3 kg/ton/minute. All but a small portion of catalyst particulates, however, having high momentum continue downwardly at high velocity out the opening 16 and into the stripper 12. Stripping steam is introduced through the nozzles 27 near the bottom of the stripper at a rate of between about 3 and 10 percent (preferably 5%) of the volume of the hydrocarbon products exiting through the primary first stage cyclones 17. The stripping steam strips hydrocarbons from the catalyst particulates and together with the stripped hydrocarbons exits from the vessel 11 through the opening 16 at the bottom of the flow reverser 13 and through the cyclone inlets 18. Because the volume of this steam flow upward through the opening 16 is very small compared with the total hydrocarbon vapor flow, the momentum of the catalyst particulates is sufficiently high to carry them rapidly through the exiting stripping steam and directly into the top of the stripper 12. Thus stripping of the particulates is initiated immediately following their substantial separation from the hydrocarbon vapors. This is especially important, since any prolonged contact results in additional coke formation and overcracking to produce undesired light ends, thus reducing the yield of valuable products. From the bottom of stripper 12 the spent catalyst is conveyed to the regenerator by transfer line 28. In the regenerator the coke is burned off and the catalyst is reactivated for recirculation to the riser reactor 10.

Because of their high momentum, a relatively very small amount of catalyst particulates enters the primary cyclones 17 and even less passes to the secondary cyclones 20. The primary and secondary cyclones perform in the usual manner and deliver the separated particulates to the bottom of the vessel 11 through dip legs 30 from which point the particulates are free to slide into the stripper 12. In many cases secondary cyclones will not be necessary because effective separation can be effected in the first stage cyclones. The spatial arrangement of the preferred embodiment of the apparatus makes the inclusion of secondary cyclones very convenient and their use can eliminate the need for decanting apparatus for the condensed effluent product.

The cracked hydrocarabon products from the cyclones 20 are conducted to the bottom of the primary fractionation tower 41 which operates in the conventional manner to separate heavy cycle oil and decanted cycle oil at the bottom and normally gaseous products and light catalytic naphtha at the top. From the drawoff tray 44 near the top of the tower 41 the mixed stream of heavy catalytic naphtha and light cycle oil to be recracked in the secondary riser cracker is withdrawn at a temperature of between about 120° to 285° C., preferably of between about 150° to 225° C. The optimum selection of the cut point will depend upon such factors as fresh feed composition and the desired finished product slate. For example if there is a high demand for heating oil, a lower cut point temperature can be selected in order to make more of the light and heavy cycle oils available for sale.

The quality of the withdrawn fraction from tray 44 is very poor as a gasoline component as it is high in sulfur and high in low octane components. Inspections of two typical withdrawn fractions are shown in the following Table:

TABLE

| Boiling point range, °C. | 110–246 | 138–250 |
|---|---|---|
| Stream composition* | | |
| $nC_5$-$C_7$ | 0.6 | 0 |
| $A_6$ | 0 | 0 |
| $A_7$ | 1.3 | 0 |
| $C_8$ | 4.2 | 0 |
| $A_8$ | 11.3 | 3.8 |
| $C_9$ | 14.4 | 0.8 |
| $A_9$ | 12.9 | 17.8 |
| $C_{10}$-$C_{12}$ | 19.6 | 27.2 |
| $A_{10}$ | 17.3 | 28.0 |
| 360 + °C+ | 18.1 | 17.9 |
| coke | 0 | 0 |
| Sulfur distribution: | | |
| gasoline boiling range: | | |
| sulfides and mercaptans | .023 | 0.40 |
| thiophene and its derivates | .041 | .014 |
| benzothiophene | .042 | .052 |

*Weight percent based on weight of feed.

Thus it is quite beneficial to subject this fraction to secondary recracking by conducting it through heat exchanger 46 to the secondary riser reactor 50 where it encounters hot regenerated catalyst from the regenerator and is vaporized and cracked as it passes up the riser 50. The operation and construction of the secondary riser reactor are essentially the same as those of the primary riser reactor except that the volume or amount of material to be cracked in the secondary riser reactor is only about 10 to 45 percent of the volume or amount of the fresh feed plus recycle passing through the primary riser reactor 10. For this reason, the diameters of the riser reactor 50 and the associated flow reverser means 55 are preferably smaller than the diameters of the corresponding parts in the primary system. The severity of the cracking reaction in the secondary riser reactor, however, is greater than in the primary because the materials being cracked are more refractory having already been subjected to cracking conditions and cracking catalyst and having resisted cracking. Thus the riser reactor 50 should be essentially the same length as riser reactor 10 in order that appropriate residence time may be achieved therein. The secondary cyclone system is, of course, also sized according to the anticipated material flow in the secondary riser reactor system. All of the matters of sizing are well known to persons with ordinary skill in the art and involve conventional procedures.

The functioning of the flow reverser means 52 and the interconnected cyclones 53 in the secondary is essentially the same as has been described in respect of the primary system with the exception that the pressure controlling function of the differential pressure controller 60 and control valve 61 come into play, as has been described, to maintain the pressure within the annular space 55 somewhat higher than the pressure within the separator vessel 11 and to prevent any flow of the vaporized products from the primary cracking from entering the annular space 55. Thus, substantially all of the vaporized products of the secondary cracking pass from the cyclones 53 to header 57 and by conduit 58 to the bottom of the secondary fractionation tower 42, where they are fractionated in the conventional manner. As shown in FIG. 2 of the drawings, the fractionation tower 42 is smaller than tower 41 because of the reduced volume of product to be handled. The overhead products from both fractionator towers pass to the gas-liquid separators and all of the gaseous products plus those portions of the light naphtha which are not used for reflux pass to a vapor recovery unit (not shown) for conventional processing.

VARIATIONS IN THE APPARATUS

In the drawings and the above description a preferred embodiment of the system of apparatus of this invention has been shown and described. As will be apparent to those skilled in the art, certain modifications may be made without departing from the spirit of this invention whose scope is defined in the claims appended hereto. For example, in the primary riser system the cyclones 17 instead of being connected into the annular space 15 could have their inlets open into the open space within the vessel 11. If this were to be done the flow reversal means 13 might be eliminated. A further modification would be to shorten the riser 10 and carry out the primary cracking in a fluidized bed rather than in a riser cracker. These variations would be quite useful in revamping existing fluid catalytic cracking units to employ the advantages of this invention.

Another variation especially suited for revamping existing units, where space to install a vertical riser entering into the separator vessel through the bottom is not available, is to mount the secondary riser adjacent to the separator vessel and to interconnect it through a crossover pipe to a downwardly extending cyclone equipped flow reversing means within the separator vessel.

We claim:

1. A fluid catalytic cracking and fractionation apparatus for simultaneously effecting primary cracking of a hydrocarbon feedstock, separating the cracked products into a desired product fraction, and a second fraction suitable for additional secondary cracking, and for recracking said second fraction, said apparatus comprising:
   (a) a primary cracking reactor having inlet means at its lower end for introduction of hydrocarbon feedstock and regenerated fluid catalytic cracking catalyst, the upper end of said primary cracking reactor opening into a separator vessel;
   (b) a primary fractionation tower interconnected with the vapor space at the top of the separator vessel for receiving and separating the vaporized cracked products from said primary cracking reactor;
   (c) a secondary riser reactor having inlet means at its lower end for receiving an intermediate fraction from said primary fractionation tower together with regenerated fluid catalytic cracking catalyst, the downstream end of said secondary riser reactor being within said separator vessel;
   (d) a flow reversal means at the downstream end of said secondary riser reactor and an attached downwardly directed flow reversal conduit for directing the flow of recracked hydrocarbon product and entrained cracking catalyst downwardly toward the bottom of said separator vessel;
   (e) cyclone separator means having an opening laterally communicating with the interior of said flow reversal conduit and connected to vent the recracked hydrocarbon products outside of the separator vessel; and
   (f) pressure control means for maintaining the pressure within said flow reversal conduit at least equal to or slightly higher than the pressure within said separator vessel whereby flow of vapor from said separator vessel into said cyclone separator means is prevented.

2. The apparatus of claim 1 wherein the flow reversal conduit and the downstream end of the secondary riser reactor are coaxially disposed, defining an annular space for the downward flow of hydrocarbon products and entrained catalyst.

3. A fluid catalytic cracking and fractionation apparatus for simultaneously effecting primary cracking of a hydrocarbon feedstock, separating the cracked products into a desired product fraction, an intermediate fraction suitable for additional secondary cracking and a heavy fraction suitable for recycle to primary cracking and for recracking said intermediate fraction, said apparatus comprising:
   (a) a primary cracking reactor having inlet means at its lower end for introduction of hydrocarbon feedstock together with a heavy recycle fraction and regenerated fluid catalytic cracking catalyst, the upper end of said primary cracking reactor opening into a separator vessel;
   (b) a primary fractionation tower interconnected with the vapor space at the top of the separator vessel for receiving and separating the vaporized cracked products from said primary cracking reactor;
   (c) a secondary riser reactor having inlet means at its lower end for receiving an intermediate fraction from said primary fractionation tower together with regenerated fluid catalytic cracking catalyst, the upper end of said secondary riser reactor being located within said separator vessel;
   (d) a flow reversal means at the upper end of said secondary riser reactor and an attached downwardly directed flow reversal conduit for directing the flow of recracked hydrocarbon product and entrained cracking catalyst downwardly toward the bottom of said separator vessel;
   (e) cyclone separator means having an opening laterally communicating with the interior of said flow reversal conduit and connected to vent the recracked hydrocarbon products outside of the separator vessel;
   (f) a secondary fractionation tower for receiving and separating the recracked hydrocarbon products from said secondary riser reactor into desired products and products suitable for recycling to the primary riser reactor; and (g) pressure control means for maintaining the pressure within said flow reversal conduit at least equal to the pressure within said separator vessel whereby flow of vapors from said separator vessel through said cyclone separator means and into said secondary fractionation tower is prevented.

4. A fluid catalyst cracking and fractionation apparatus for simultaneously effecting primary cracking of a hydrocarbon feedstock, separating the cracked products into a desired product fraction, an intermediate fraction suitable for additional secondary cracking and a heavy fraction suitable for recycle to the primary cracking, and for recracking said intermediate fraction, said apparatus comprising:

(a) a primary cracking reactor having inlet means at its lower end for introduction of hydrocarbon feedstock together with a heavy recycle fraction and regenerated fluid cracking catalyst, the upper end of said primary cracking reactor opening into a separator vessel;

(b) a primary fractionation tower interconnected with vapor space at the top of the separator vessel for receiving and separating the vaporized cracked products from said primary cracking reactor;

(c) a secondary riser reactor having inlet means at its lower end for receiving an intermediate fraction from said primary fractionation tower together with regenerated fluid catalytic cracking catalyst, the upper end of said secondary riser reactor also opening into said separator vessel;

(d) a flow reversal means at the upper end of said secondary riser reactor and an attached downwardly directed flow reversal conduit for directing the flow of recracked hydrocarbon product and entrained cracking catalyst downwardly toward the bottom of said separator vessel;

(e) means for maintaining the pressure within said flow reversal conduit at least equal to or slightly higher than the pressure in said separator vessel to prevent flow of vapors from said separator vessel into said conduit; and (f) a secondary fractionation tower connected to said flow reversal conduit for receiving and separating the recracked hydrocarbon products into desired products and products suitable for recycling to the primary cracking reactor.

* * * * *